United States Patent
Kamat et al.

(10) Patent No.: US 10,742,559 B2
(45) Date of Patent: Aug. 11, 2020

(54) ELIMINATING DATA TRAFFIC REDIRECTION IN SCALABLE CLUSTERS

(71) Applicant: A10 NETWORKS, INC., San Jose, CA (US)

(72) Inventors: Gurudeep Kamat, San Jose, CA (US); Swaminathan Sankar, San Jose, CA (US); Gennady Dosovitsky, Sunnyvale, CA (US); Rajkumar Jalan, Saratoga, CA (US)

(73) Assignee: A10 Networks, Inc., San Jose, CA (US)

( * ) Notice: Subject to any disclaimer, the term of this patent is extended or adjusted under 35 U.S.C. 154(b) by 11 days.

(21) Appl. No.: 15/967,423

(22) Filed: Apr. 30, 2018

(65) Prior Publication Data
US 2018/0248805 A1 Aug. 30, 2018

Related U.S. Application Data

(63) Continuation-in-part of application No. 14/261,365, filed on Apr. 24, 2014, now Pat. No. 9,961,130.

(51) Int. Cl.
*G06F 15/16* (2006.01)
*H04L 12/851* (2013.01)
(Continued)

(52) U.S. Cl.
CPC .............. *H04L 47/24* (2013.01); *H04L 45/28* (2013.01); *H04L 45/46* (2013.01); *H04L 47/125* (2013.01);
(Continued)

(58) Field of Classification Search
CPC ...... H04L 43/16; H04L 47/125; H04L 67/102
See application file for complete search history.

(56) References Cited

U.S. PATENT DOCUMENTS

| | | | |
|---|---|---|---|
| 4,475,192 A | 10/1984 | Fernow et al. | |
| 5,042,032 A | 8/1991 | Dighe et al. | |

(Continued)

FOREIGN PATENT DOCUMENTS

| | | |
|---|---|---|
| CN | 1554055 | 12/2004 |
| CN | 101019387 | 8/2007 |

(Continued)

OTHER PUBLICATIONS

Bennett, et al., "High Speed, Scalable, and Accurate Implementation of Packet Fair Queueing Algorithms in ATM Networks," Proceedings ICNP, 1997, pp. 7-14.

(Continued)

*Primary Examiner* — Umar Cheema
*Assistant Examiner* — Tesfu N Mekonen
(74) *Attorney, Agent, or Firm* — Keith Kline; The Kline Law Firm PC

(57) ABSTRACT

Provided are methods and systems for eliminating a redirection of data traffic in a cluster. An example method may include receiving, by one or more nodes of the cluster, a data packet associated with a service session. The method may include determining, by the node, that the data packet is directed to a further node in the cluster. The method may further include, in response to the determination, acquiring, by the node, a session context associated with the service session. Acquiring the session context may include sending, by the node, a request for the session context to the further node and receiving the session context from the further node. The method may further include processing, by the one or more nodes, the data packet based on the session context.

15 Claims, 13 Drawing Sheets

(51) Int. Cl.
  *H04L 12/927* (2013.01)
  *H04L 12/803* (2013.01)
  *H04L 29/08* (2006.01)
  *H04L 12/813* (2013.01)
  *H04L 29/06* (2006.01)
  *H04L 12/703* (2013.01)
  *H04L 12/715* (2013.01)

(52) U.S. Cl.
  CPC ............ *H04L 47/20* (2013.01); *H04L 47/801* (2013.01); *H04L 47/805* (2013.01); *H04L 67/10* (2013.01); *H04L 67/14* (2013.01); *H04L 67/2814* (2013.01); *H04L 67/42* (2013.01)

(56) References Cited

U.S. PATENT DOCUMENTS

| | | |
|---|---|---|
| 5,732,041 A | 3/1998 | Joffe |
| 5,822,512 A | 10/1998 | Goodrum et al. |
| 5,859,835 A | 1/1999 | Varma et al. |
| 5,909,686 A | 6/1999 | Muller et al. |
| 5,935,207 A | 8/1999 | Logue et al. |
| 5,960,174 A | 9/1999 | Dew |
| 6,047,000 A | 4/2000 | Tsang et al. |
| 6,058,116 A | 5/2000 | Hiscock et al. |
| 6,118,768 A | 9/2000 | Bhatia et al. |
| 6,134,217 A | 10/2000 | Stiliadis et al. |
| 6,314,501 B1 | 11/2001 | Gulick et al. |
| 6,359,861 B1 | 3/2002 | Sui et al. |
| 6,430,156 B1 | 8/2002 | Park et al. |
| 6,438,134 B1 | 8/2002 | Chow et al. |
| 6,470,016 B1 | 10/2002 | Kalkunte et al. |
| 6,532,213 B1 | 3/2003 | Chiussi et al. |
| 6,532,501 B1 | 3/2003 | McCracken |
| 6,560,230 B1 | 5/2003 | Li et al. |
| 6,577,596 B1 | 6/2003 | Olsson et al. |
| 6,594,701 B1 | 7/2003 | Forin |
| 6,650,641 B1 | 11/2003 | Albert et al. |
| 6,654,374 B1 | 11/2003 | Fawaz et al. |
| 6,674,721 B1 | 1/2004 | Dittia et al. |
| 6,714,517 B1 | 3/2004 | Fawaz et al. |
| 6,735,206 B1 | 5/2004 | Oki |
| 6,735,210 B1 | 5/2004 | Lindeborg et al. |
| 6,765,915 B1 | 7/2004 | Metzger et al. |
| 6,785,232 B1 | 8/2004 | Kotser et al. |
| 6,813,268 B1 | 11/2004 | Kalkunte et al. |
| 6,888,806 B1 | 5/2005 | Miller et al. |
| 6,891,835 B2 | 5/2005 | Kalkunte et al. |
| 6,892,309 B2 | 5/2005 | Richmond et al. |
| 6,920,109 B2 | 7/2005 | Yazaki et al. |
| 6,940,861 B2 | 9/2005 | Liu et al. |
| 7,139,267 B2 | 11/2006 | Lu et al. |
| 7,236,491 B2 | 6/2007 | Tsao et al. |
| 7,353,259 B1 | 4/2008 | Bakke et al. |
| 7,421,478 B1 | 9/2008 | Muchow |
| 7,451,221 B2 | 11/2008 | Basani et al. |
| 7,606,867 B1 | 10/2009 | Singhal et al. |
| 7,627,672 B2 | 12/2009 | Lai et al. |
| 7,660,824 B2 | 2/2010 | Halpern et al. |
| 7,673,008 B2 | 3/2010 | Kojima |
| 7,738,504 B1 | 6/2010 | Deaner et al. |
| 7,849,178 B2 | 12/2010 | Shen et al. |
| 7,949,893 B1 | 5/2011 | Knaus et al. |
| 8,122,289 B2 | 2/2012 | Sargor et al. |
| 8,266,235 B2 | 9/2012 | Jalan et al. |
| 8,612,612 B1 | 12/2013 | Dukes et al. |
| 8,849,938 B2 | 9/2014 | Jalan et al. |
| 8,897,154 B2 | 11/2014 | Jalan et al. |
| 9,154,577 B2 | 10/2015 | Jalan et al. |
| 9,477,563 B2 | 10/2016 | Jalan et al. |
| 9,596,134 B2 | 3/2017 | Jalan et al. |
| 9,838,472 B2 | 12/2017 | Jalan et al. |
| 9,961,130 B2 | 5/2018 | Kamat et al. |
| 10,318,288 B2 * | 6/2019 | Jalan ............... H04L 41/5051 |
| 2001/0043564 A1 | 11/2001 | Bloch et al. |
| 2002/0012348 A1 | 1/2002 | Mizuhara et al. |
| 2002/0071387 A1 | 6/2002 | Horiguchi et al. |
| 2002/0075875 A1 | 6/2002 | Dravida et al. |
| 2002/0131413 A1 | 9/2002 | Tsao et al. |
| 2003/0023898 A1 | 1/2003 | Jacobs et al. |
| 2003/0133406 A1 | 7/2003 | Fawaz et al. |
| 2003/0140132 A1 | 7/2003 | Champagne et al. |
| 2003/0158886 A1 | 8/2003 | Walls et al. |
| 2003/0169734 A1 | 9/2003 | Lu et al. |
| 2003/0189947 A1 | 10/2003 | Beshai |
| 2004/0024831 A1 | 2/2004 | Yang et al. |
| 2004/0059813 A1 | 3/2004 | Bolder et al. |
| 2004/0228274 A1 | 11/2004 | Yazaki et al. |
| 2004/0246980 A1 | 12/2004 | Balakrishnan |
| 2004/0264481 A1 | 12/2004 | Darling et al. |
| 2004/0268358 A1 | 12/2004 | Darling et al. |
| 2005/0055435 A1* | 3/2005 | Gbadegesin ............ H04L 29/06 709/224 |
| 2005/0163049 A1 | 7/2005 | Yazaki et al. |
| 2005/0243856 A1 | 11/2005 | Mishra et al. |
| 2006/0031506 A1 | 2/2006 | Redgate |
| 2006/0101372 A1 | 5/2006 | Zhuo et al. |
| 2006/0104230 A1 | 5/2006 | Gidwani |
| 2006/0123479 A1 | 6/2006 | Kumar et al. |
| 2006/0164987 A1 | 7/2006 | Ruiz Floriach et al. |
| 2006/0206594 A1 | 9/2006 | Brown et al. |
| 2007/0081527 A1 | 4/2007 | Betker et al. |
| 2007/0086428 A1 | 4/2007 | Lai et al. |
| 2008/0104215 A1 | 5/2008 | Excoffier et al. |
| 2009/0204699 A1 | 8/2009 | Kortright |
| 2010/0049836 A1 | 2/2010 | Kramer |
| 2010/0094967 A1 | 4/2010 | Zuckerman et al. |
| 2010/0162036 A1* | 6/2010 | Linden ................. G06F 11/181 714/4.11 |
| 2010/0222072 A1* | 9/2010 | Dragt ..................... H04W 4/02 455/456.1 |
| 2011/0066672 A1 | 3/2011 | Zamarreno et al. |
| 2011/0161405 A1 | 6/2011 | He |
| 2012/0057591 A1* | 3/2012 | Erman ............... H04L 63/0218 370/389 |
| 2012/0281540 A1 | 11/2012 | Khan et al. |
| 2013/0151686 A1 | 6/2013 | Takaoka et al. |
| 2013/0268646 A1* | 10/2013 | Doron ............... H04L 67/1002 709/223 |
| 2014/0115176 A1* | 4/2014 | Kamboh ............. H04L 67/142 709/228 |
| 2015/0039674 A1 | 2/2015 | Agarwal et al. |
| 2015/0195182 A1 | 7/2015 | Mathur et al. |
| 2016/0112503 A1* | 4/2016 | Yang ................. H04L 12/6418 709/223 |
| 2017/0006092 A1* | 1/2017 | Rochwerger ........ H04L 67/1002 |

FOREIGN PATENT DOCUMENTS

| | | |
|---|---|---|
| CN | 101252506 | 8/2008 |
| CN | 101519078 | 9/2009 |
| CN | 102708004 | 10/2012 |
| CN | 102984194 | 3/2013 |
| EP | 2663919 | 11/2013 |
| HK | 1183571 | 12/2013 |
| HK | 1186802 | 3/2014 |
| JP | H06044090 | 2/1994 |
| JP | 2002278787 | 9/2002 |
| JP | 2003345640 | 12/2003 |
| JP | 2007257023 | 10/2007 |
| JP | 2009003923 | 1/2009 |
| JP | 5948345 | 7/2016 |
| TW | 542960 | 7/2003 |
| TW | I233734 | 6/2005 |
| TW | I277324 | 3/2007 |
| WO | WO2010077222 | 7/2010 |
| WO | WO2012097015 | 7/2012 |

(56) References Cited

FOREIGN PATENT DOCUMENTS

| WO | WO2012170226 | 12/2012 |
|----|--------------|---------|
| WO | WO2015164027 | 10/2015 |

OTHER PUBLICATIONS

Bennett, et al., "WF2Q: Worst-Case Fair Weighted Fair Queueing," Proceedings IEEE INFOCOM, 1996, vol. 1, pp. 120-128.
Chaskar, et al., "Fair Scheduling with Tunable Latency: A Round Robin Approach," Global Telecommunications Conference, 1999, pp. 1328-1333.
Golestani, "A Self-Clocked Fair Queueing Scheme for Broadband Applications," Proceedings of IEEE INFOCOM, 1994, pp. 636-646.
Katevenis, et al., "Weighted Round-Robin Cell Multiplexing in a General-Purpose ATM Switch Chip," IEEE Journal on Selected Areas in Communications, 1991, vol. 9 (8), pp. 1265-1279.
Matsurfuru, et al., "Efficient Fair Queueing for ATM Networks Using Uniform Round Robin," Proceedings INFOCOM, 1999, pp. 389-397.
Nagashwara, et al., "Concurrent Access of Priority Queues," IEEE Transactions on Computers, 1988, vol. 37 (12), pp. 1657-1665.
Parekh, et al., "A Generalized Processor Sharing Approach to Flow Control in Integrated Services Networks: The Single-Node Case," IEEE/ACM Transactions on Networking, 1993, vol. 1 (3), pp. 344-357.
Rexford, et al., "Hardware-Efficient Fair Queueing Architectures for High-Speed Networks," Proceedings INFOCOM, 1996, pp. 638-646.
Shreedhar, et al., "Efficient Fair Queuing Using Deficit Round-Robin," IEEE/ACM Transactions on Networking, 1996, vol. 4 (3), pp. 375-385.
Search Report and Written Opinion dated Jun. 25, 2015 for PCT Application No. PCT/US2015/022858.
Stiliadis, et al., "Efficient Fair Queueing Algorithms for Packet-Switched Networks," IEEE/ACM Transactions on Networking, 1998, vol. 6 (2), pp. 175-185.
Stiliadis, et al., "Latency-Rate Servers: A General Model for Analysis of Traffic Scheduling Algorithms," IEEE/ACM Transactions on Networking, 1998, vol. 6 (5), pp. 611-624.
Suri, et al., "Leap Forward Virtual Clock: A New Fair Queuing Scheme with Guaranteed Delays and Throughput Fairness," Proceedings INFOCOM, 1997, pp. 557-565.
Zhang, "VirtualClock: A New Traffic Control Algorithm for Packet-Switched Networks," ACM Transactions on a Computer Systems, 1991, vol. 9 (2), pp. 101-124.

\* cited by examiner

700

RECEIVE, BY A FORWARDING NODE, A DATA PACKET DIRECTED TO A FIRST SERVICING NODE
702

DETERMINE, BY THE FORWARDING NODE, THAT THE FIRST SERVICING NODE IS UNAVAILABLE
704

BASED ON THE DETERMINING, SELECT A SECOND SERVICING NODE FROM A PLURALITY OF SERVICING NODES, THE SELECTING BEING BASED ON A HIGH AVAILABILITY POLICY
706

SEND THE DATA PACKET TO THE SECOND SERVICING NODE
708

FIG. 7

ELIMINATING DATA TRAFFIC REDIRECTION IN SCALABLE CLUSTERS

CROSS-REFERENCE TO RELATED APPLICATIONS

This patent application is a continuation-in-part and claims the benefit of U.S. patent application Ser. No. 14/261,365, titled "Distributed High Availability Processing Methods for Service Sessions," and filed Apr. 24, 2014, now U.S. Pat. No. 9,961,130, issued May 1, 2018 the disclosure of which is incorporated by reference herein in its entirety.

TECHNICAL FIELD

This disclosure relates generally to data processing and, more particularly, to eliminating data traffic redirection in scalable clusters.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Network servicing nodes such as server load balancers, application delivery controllers, or traffic managers can facilitate service sessions between a plurality of client devices and a plurality of servers. These servicing nodes can typically balance loads among servers servicing Web documents, voice calls, advertisements, enterprise applications, video streaming services, file transfers, gaming, or any broadband services. In a typical deployment scenario, a client service session terminates in a servicing node that can relay the client service session data to an intended service using a server service session. The servicing node can usually provide additional processing based on service and security policies while relaying the data between the client and the server.

The service nodes can be connected in scalable clusters. The scalable clusters can be utilized by a carrier-grade NAT (CGN) based network. Currently, traffic distribution between nodes in a cluster is carried out by using a hashing mechanism based on the source IP address and other parameters. Therefore, only one node in the cluster may process traffic from a particular Internet Protocol (IP) address and only this one node has the full context information required for the processing. The distribution of traffic between nodes includes an external distribution component, such as a hashing-based router, and an internal component, located in the cluster. The external component may not be aware of which node has the context information for the traffic from the IP address. The internal component may keep information as to which of the nodes has the context information for this traffic and send the traffic to a node responsible for processing the traffic. However, there is a probability that traffic will be sent to another node that is not responsible for processing of this traffic. Because another node may not have context information for processing the traffic, the traffic must be redirected to the correct node. To eliminate redirection for the downstream traffic, the cluster nodes must advertise to the upstream router the correct path to the node that processes the traffic for the particular NAT IP. The amount of redirection might significantly increase during a cluster's resizing and failovers. Due to the need for redirections, the cluster nodes must spend significant computing and network resources for delivering data traffic when redirection is required and advertising to the routers to reduce the number of redirections.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to systems and methods for eliminating redirection of data traffic in scalable clusters. Embodiments of the present disclosure may allow for eliminating a need for redirection of data packets in cluster of nodes.

According to one embodiment of the present disclosure, a system for eliminating a redirection of data traffic is provided. The system may include a cluster including one or more nodes. A node can be configured to receive a data packet associated with a service session. A node can be configured to determine that the data packet is directed to a further node in the cluster. In response to the determination, the node can be further configured to acquire a session context associated with the service session. The node can be further configured to process the data packet based on the session context. A time required to acquire, by the node, the session context can be less than a time required to deliver the data packet to the further node. The node can be further configured to store the session context in a dedicated memory.

The system may further include a control plane configured to acquire the session context from the one or more nodes to obtain a plurality of session contexts of service sessions. The nodes can be configured to acquire a further session context by sending a request for the further session context to the control plane.

The control plane can be further configured to synchronize one or more session contexts from the plurality of session contexts with the session context stored in the one or more nodes in the cluster. Prior to synchronizing the session contexts, the control plane can select the session contexts from the plurality of session contexts based on priorities of the service sessions. The priorities of the service sessions can be based on latency requirements for the service sessions.

To acquire the session context, the node can be also configured to send a request for the session context to the further node and receive the session context from the further node.

The node can be further configured to receive a further packet of a further service session, generate a further session context associated with the further service session, and send the further session context to one or more further nodes of the cluster.

According to one embodiment of the present disclosure, a method for eliminating a redirection of data traffic in a cluster is provided. The method may include receiving, by one or more nodes of the cluster, a data packet associated with a service session. The method may further include determining, by the node, that the data packet is directed to a further node in the cluster. The method may further allow, in response to the determination, acquiring, by the node, a session context associated with the service session. The method may include processing, by the one or more nodes, the data packet based on the session context.

The acquiring the session context may include sending, by the one or more nodes, a request for the session context to the further node and receiving the session context from the further node.

The method may further include storing, by a control plane, a plurality of session contexts of service sessions. Acquiring, by the node, the session context may include sending, by the node, a request for the session context to the control plane.

The method may further include selecting, by the control plane, one or more session contexts from the plurality of session contexts based on priorities of the service sessions. The method may further include synchronizing, by the control plane, the selected session with the session contexts stored in the nodes of the cluster.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

FIG. 7 is a process flow diagram showing a method for processing a data packet associated with a service session.

DETAILED DESCRIPTION

Figure 1:
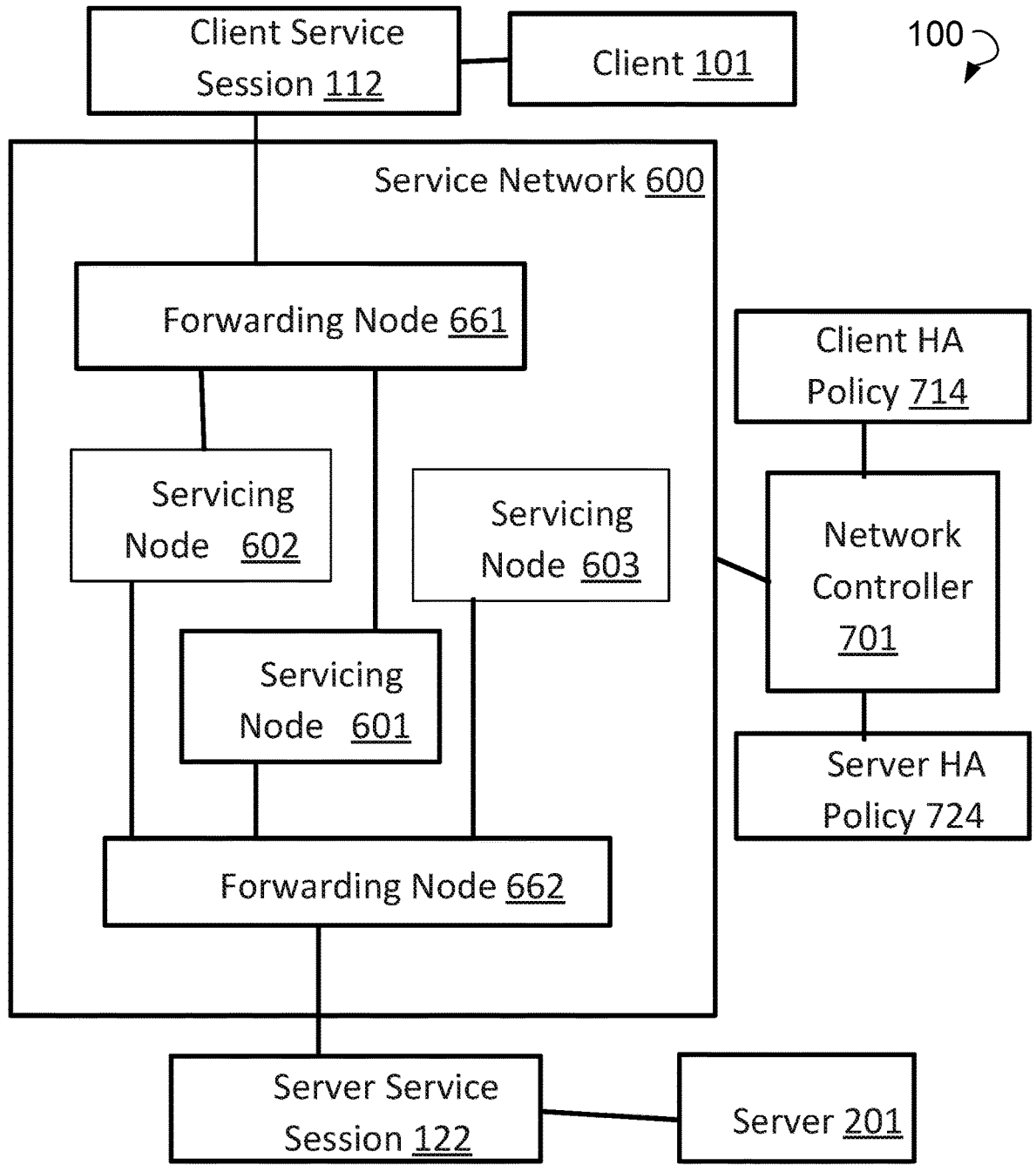
FIG. 1 is a block diagram showing a service data network providing high availability for handling a service session between a client and a server.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein can be implemented in software executing on a computer system or in hardware utilizing either a combination of microprocessors or other specially designed application-specific integrated circuits (ASICs), programmable logic devices, or various combinations thereof. In particular, the methods described herein can be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

The present disclosure relates to methods and systems for eliminating redirection of data traffic in clusters of nodes. Embodiments of the present disclosure may eliminate need for redirection or reduce a number of data packets redirected from one node of the cluster to another node of the cluster, when the data packet is accidently sent to a node that is not responsible for processing of the data packets. Some embodiments of the present disclosure may prevent or reduce the number of redirections of data traffic when some of the nodes of the cluster are failed or the cluster is resized. Some embodiments may allow to reduce amount of traffic between the nodes of a cluster and an upstream router or downstream router, wherein the upstream router and downstream router map the nodes of the cluster with client devices.

According to some embodiments of the present disclosure, a method for eliminating a redirection of data traffic in a cluster may include receiving, by one or more nodes of the cluster, a data packet associated with a service session. The method may further include determining, by the node, that the data packet is directed to a further node in the cluster. The method may further allow, in response to the determination, acquiring, by the node, a session context associated with the service session. The method may include processing, by the one or more nodes, the data packet based on the session context.

Referring now to the drawings, FIG. 1 is a block diagram showing a data network 100 handling a service session between a client device and a server device, according to an example embodiment. In an embodiment, a client device shown as client 101 conducts a data service session with a server device shown as server 201 through servicing node 601 of a service network 600. The service session between client 101 and server 201 can include a client service session 112, between client 101 and servicing node 601, and a server service session 122, between servicing node 601 and server 201. In one embodiment, client 101 sends data packets of client service session 112 to servicing node 601. In one embodiment, forwarding node 661 of service network 600 receives the data packets of client service session 112 and forwards the data packets to servicing node 601. When servicing node 601 receives the data packets of client service session 112, servicing node 601 processes and modifies the data packets of client service session 112 and sends the modified data packets to server 201. The processing and modifications of the data packets of client service session 112 are described in detail with reference to FIG. 3.

In one embodiment, client device shown as client 101 can include a personal computer (PC), a laptop, a smartphone, a cell phone, a tablet, a personal digital assistant (PDA), a desktop, a notebook, a set top box, a network connected device, a computer, a network connecting computing device, a network element such as an Ethernet switch, a router, or any network computing device seeking a service from a server.

In one embodiment, service network 600 connects to one server 201. Server 201 may be a Web server, a video server, a music server, an e-commerce server, an enterprise application server, a news server, a mobile broadband service server, a messaging server, an email server, a game server, an app server, an Internet radio server, a storage server, a social network services server, or a network computing device providing services to a service session from client 101. The service session may be a Web page access session, an e-commerce transaction session, a video playing session, a music playing session, a file transfer session, an image downloading session, a message chat session, a session to send a message, a picture, a video, a file, a game playing session, or any data communication session between client 101 and server 201.

In one embodiment, service network 600 includes an Ethernet network, an Asynchronous Transfer Mode (ATM) network, a cellular network, a wireless network, a Frame Relay network, an optical network, an IP network, or a data network utilizing other physical layer, link layer capability or network layer to carry data packets. In one embodiment, service network 600 connects to network controller 701, which communicates to one or more network nodes in service network 600.

In one embodiment, forwarding node 661 or forwarding node 662 may include an Ethernet switch, a network switch, a router, a link aggregator, or a network device forwarding data packets from a network interface to another network interface included in the network device.

In one embodiment, server 201 sends the data packets of server service session 122 to servicing node 601 through service network 600. In one embodiment, forwarding node 662 of service network 600 receives the data packets of server service session 122 and sends the data packets to servicing node 601. Servicing node 601 can receive, process, and modify the data packets of server service session 122 and send the modified data packets to client 101. The processing and modification of the data packets of server service session 122 are described in detail with reference to FIG. 4.

In one embodiment, servicing node 601 becomes unavailable. Servicing node 601 may be unavailable due to failure, maintenance shutdown, or disconnection from forwarding node 661 or forwarding node 662. Servicing node 602 and servicing node 603 participate to service client service session 112 and server service session 122 to provide high availability services to client 101 and server 201. In one embodiment, network controller 701 sends client HA policy 714 to servicing node 601 and servicing node 602. When servicing node 601 fails, servicing node 602 takes over processing of the data packets of client service session 112 and the data packets of server service session 122. In one embodiment, forwarding node 661 recognizes a failure of servicing node 601 and sends the data packets of client service session 112 to servicing node 602. Servicing node 602 receives the data packets of client service session 112, processes and modifies the received data packets, and sends the modified data packets to server 201.

In one embodiment, network controller 701 sends server HA policy 724 to servicing node 601 and servicing node 603. After servicing node 601 fails, forwarding node 662 sends the data packets of server service session 122 to servicing node 603. Servicing node 603 receives the data packets of server service session 122 and redirects the data packets of server service session 122 to servicing node 602. In one embodiment, servicing node 603 receives an indication from network controller 701 about servicing node 602, or an indication from servicing node 602 to redirect the data packets of server service session 122 to servicing node 602. In one embodiment, servicing node 603 receives client HA policy 714 to determine servicing node 602 for the data packet redirect.

In one embodiment, servicing node 602 receives the data packets of server service session 122 from servicing node 603, processes and modifies the data packets of server service session 122, and sends the modified data packets to client 101.

Figure 2:
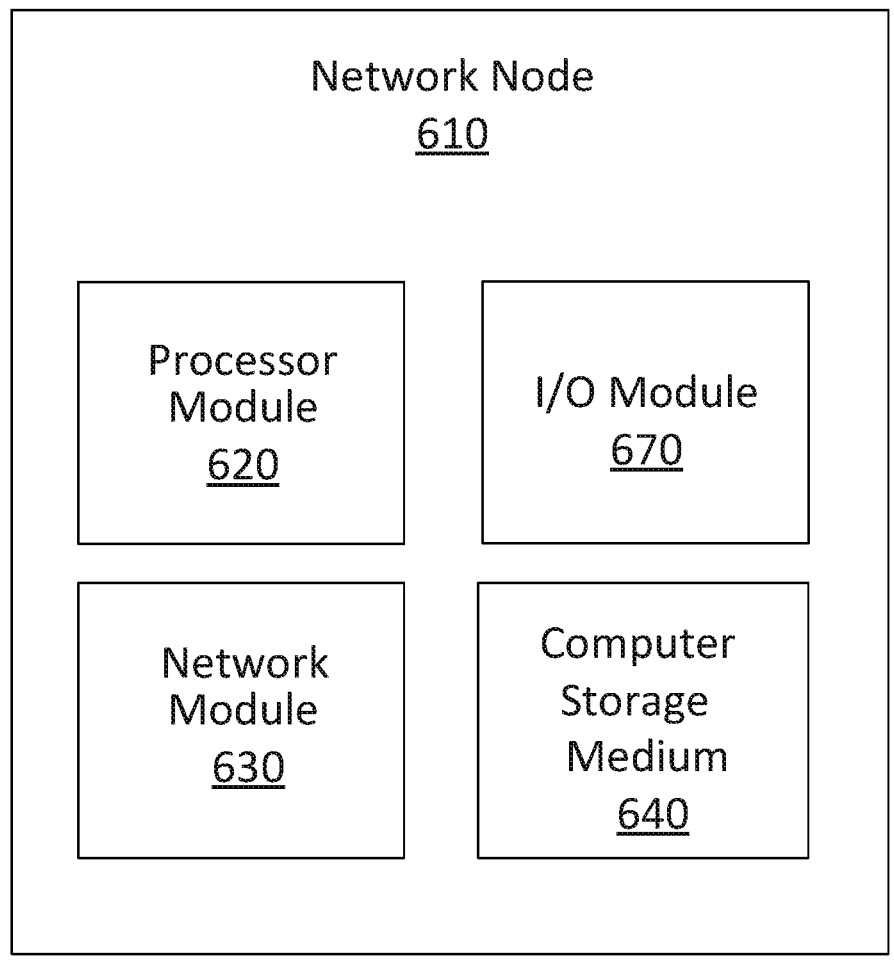
FIG. 2 is a block diagram showing components of a network node.

FIG. 2 illustrates a network node 610, such as a servicing node or a network controller, according to an example embodiment. Network node 610 includes a processor module 620, a network module 630, and a computer storage medium 640. In one embodiment, processor module 620 includes one or more processors which may be a microprocessor, an Intel processor, an AMD processor, a MIPS processor, an ARM-based processor, or a RISC processor. In one embodiment, processor module 620 includes one or more processor cores embedded in a processor. In one embodiment, processor module 620 includes one or more embedded processors, or embedded processing elements in a Field Programmable Gate Array (FPGA), an ASIC, or Digital Signal Processor (DSP).

In one embodiment, network module 630 includes a network interface such as Ethernet, optical network interface, a wireless network interface, T1/T3 interface, or a WAN or LAN interface. In one embodiment, network module 630 includes a network processor. In one embodiment, storage medium 640 includes RAM, DRAM, SRAM, SDRAM, or memory utilized by processor module 620 or network module 630.

In one embodiment, storage medium 640 stores data utilized by processor module 620. In one embodiment, storage medium 640 includes a hard disk drive, a solid-state drive, an external disk, a DVD, a CD, or a readable external disk. Storage medium 640 stores one or more computer programming instructions which when executed by processor module 620 or network module 630 implement one or more of the functionalities of the present disclosure.

In one embodiment, network node 610 further includes an input/output (I/O) module 670, which may include a keyboard, a keypad, a mouse, a gesture-based input sensor, a microphone, a physical or sensory input peripheral, a display, a speaker, or a physical or sensual output peripheral.

Figure 3:
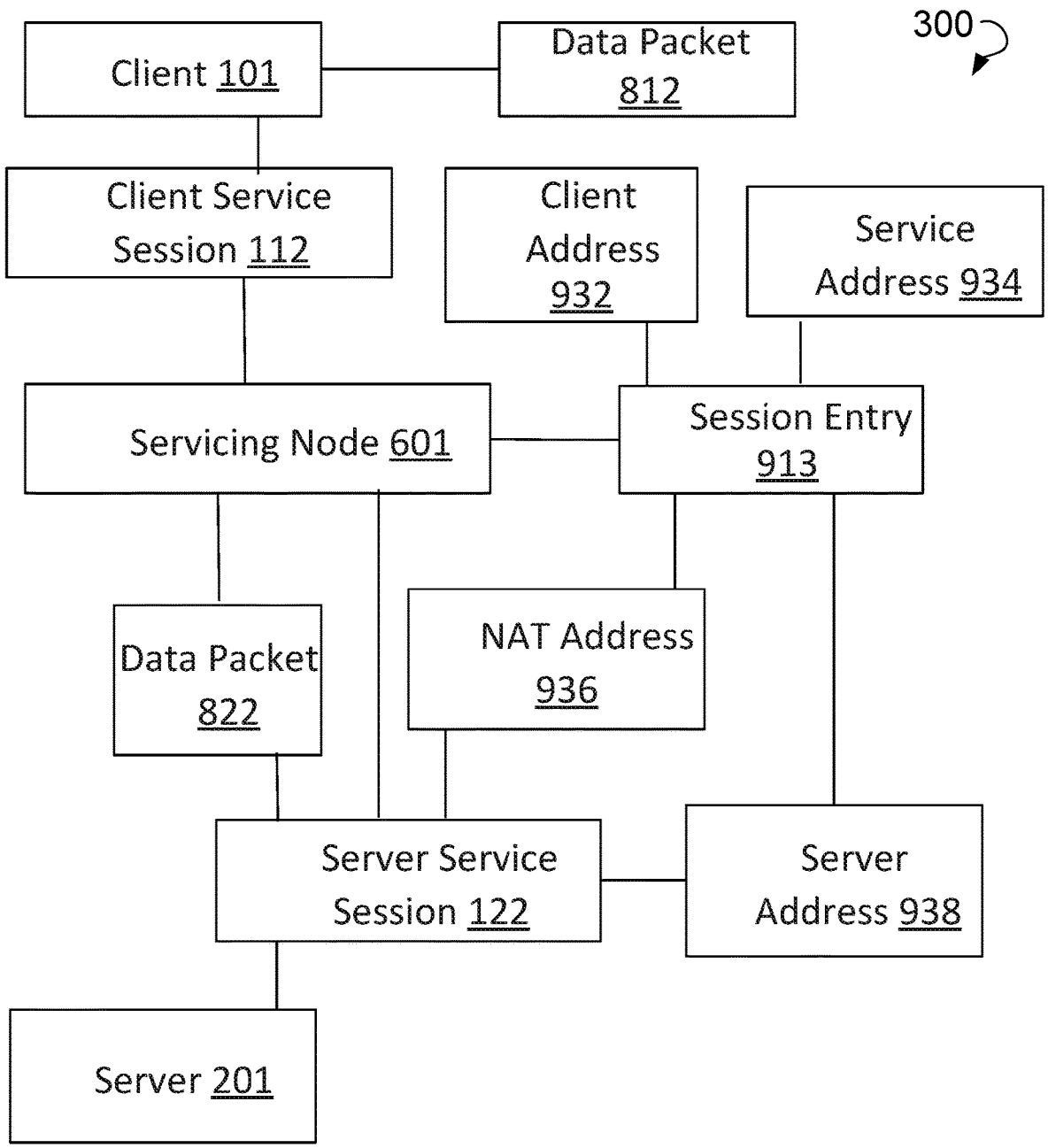
FIG. 3 is a block diagram showing a servicing node processing a client service session.

FIG. 3 is a block diagram 300 showing servicing node 601 processing client service session 112, according to an example embodiment. In one embodiment, client 101 sends data packet 812 of client service session 112 to servicing node 601. In one embodiment, data packet 812 is a service request for a service. Servicing node 601 processes the service request of data packet 812 and selects server 201 to serve client service session 112. In one embodiment, servicing node 601 creates a session entry 913 to associate to client service session 112. Servicing node 601 further associates a NAT address 936 with session entry 913. Servicing node 601 uses NAT address 936 and a server network address 938 to establish server service session 122 with server 201.

In one embodiment, data packet 812 is a service data packet that client 101 sends to server 201 through servicing node 601. Upon receiving data packet 812, servicing node 601 processes data packet 812 according to a network application in servicing node 601. In one embodiment, servicing node 601 generates data packet 822 based on data packet 812 and sends data packet 822 to server 201. In one embodiment, servicing node 601 uses NAT address 936 as the source network address for data packet 822, and server address 938 as the destination network address for data packet 822.

Embodiments of a network application in servicing node 601 include one or more of security detection, content inspection, deep packet inspection, application proxy, legal interception, accounting and billing, content caching, virus detection, intrusion detection and prevention, bandwidth management, traffic management, service policy processing based on company policy, government policy, service provider policy, server load balancing, network optimization, data de-duplication, access control, or any third party network application requested by a network computer. In one embodiment, the network application is processed by the processor module of servicing node 601.

In one embodiment, servicing node 601 extracts client address 932 and service address 934 from data packet 812 and stores client address 932 and service address 934 in session entry 913. In one embodiment, client address 932 is a network address of client 101, and servicing node 601 extracts client address 932 from the source network address of data packet 812. In one embodiment, service address 934 is obtained from the destination network address of data packet 812. In one embodiment, service address 934 is obtained from a service policy stored in servicing node 601.

Figure 4:
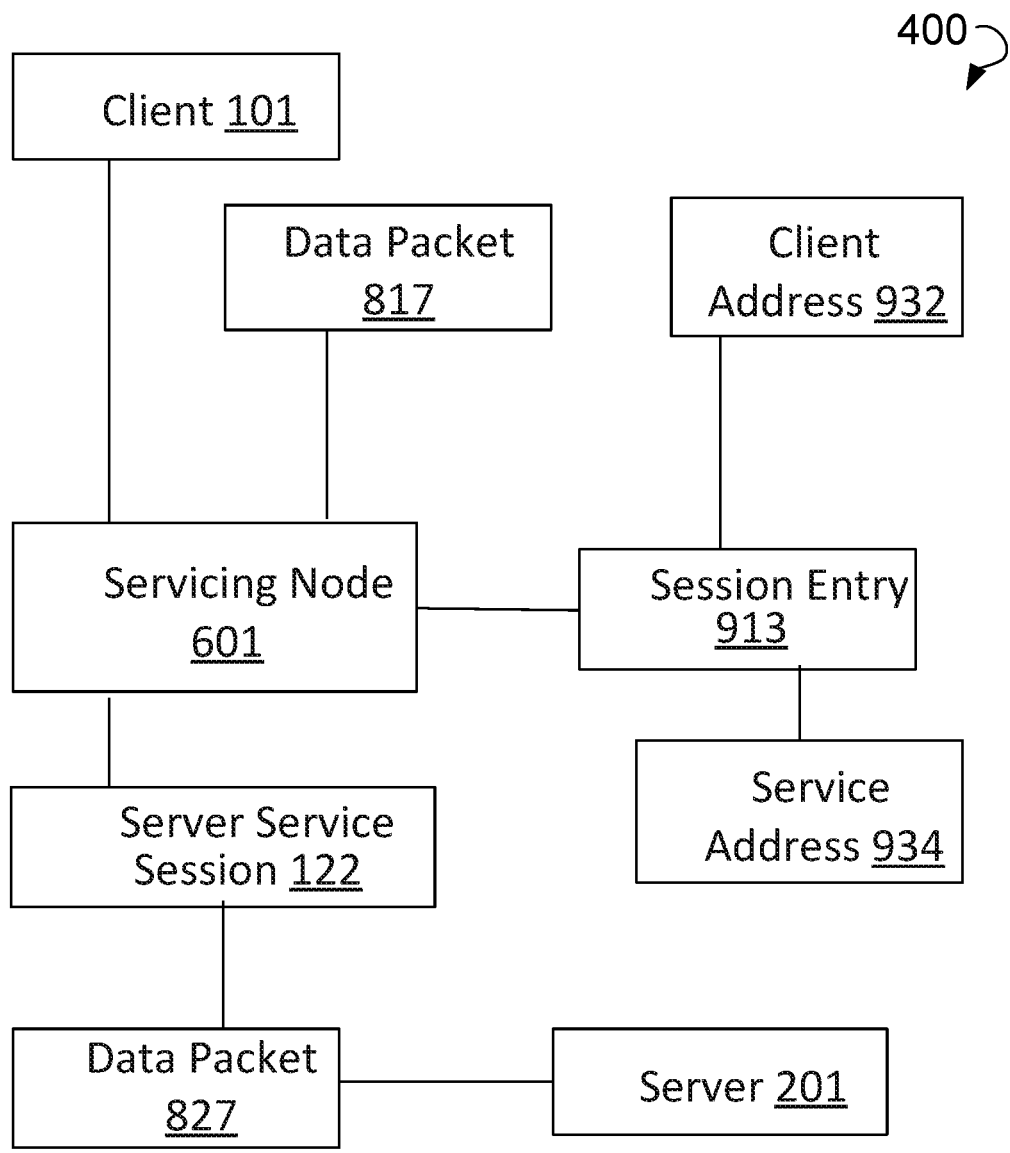
FIG. 4 is a block diagram showing a servicing node processing a server service session.

FIG. 4 is a block diagram 400 illustrating servicing node 601 processing server service session 122, according to an example embodiment. In one embodiment, server 201 sends a data packet 827 of server service session 122 to servicing node 601. Servicing node 601 retrieves session entry 913 of server service session 122 and processes data packet 827 based on session entry 913. In one embodiment, servicing node 601 generates data packet 817 based on data packet 827 and session entry 913. In one embodiment, servicing address 601 uses client address 932 retrieved from session entry 913 as the destination network address of data packet 817, and service address 934 retrieved from session entry 913 as the source network address of data packet 817. Servicing node 601 sends data packet 817 to client 101.

In one embodiment, a network address illustrated in FIG. 3 and FIG. 4 includes one or more of an IP address, a TCP or a UDP port number, a link layer address, a VLAN identity, a network tunnel identity, a transport layer address, and an application layer address.

Figure 5:
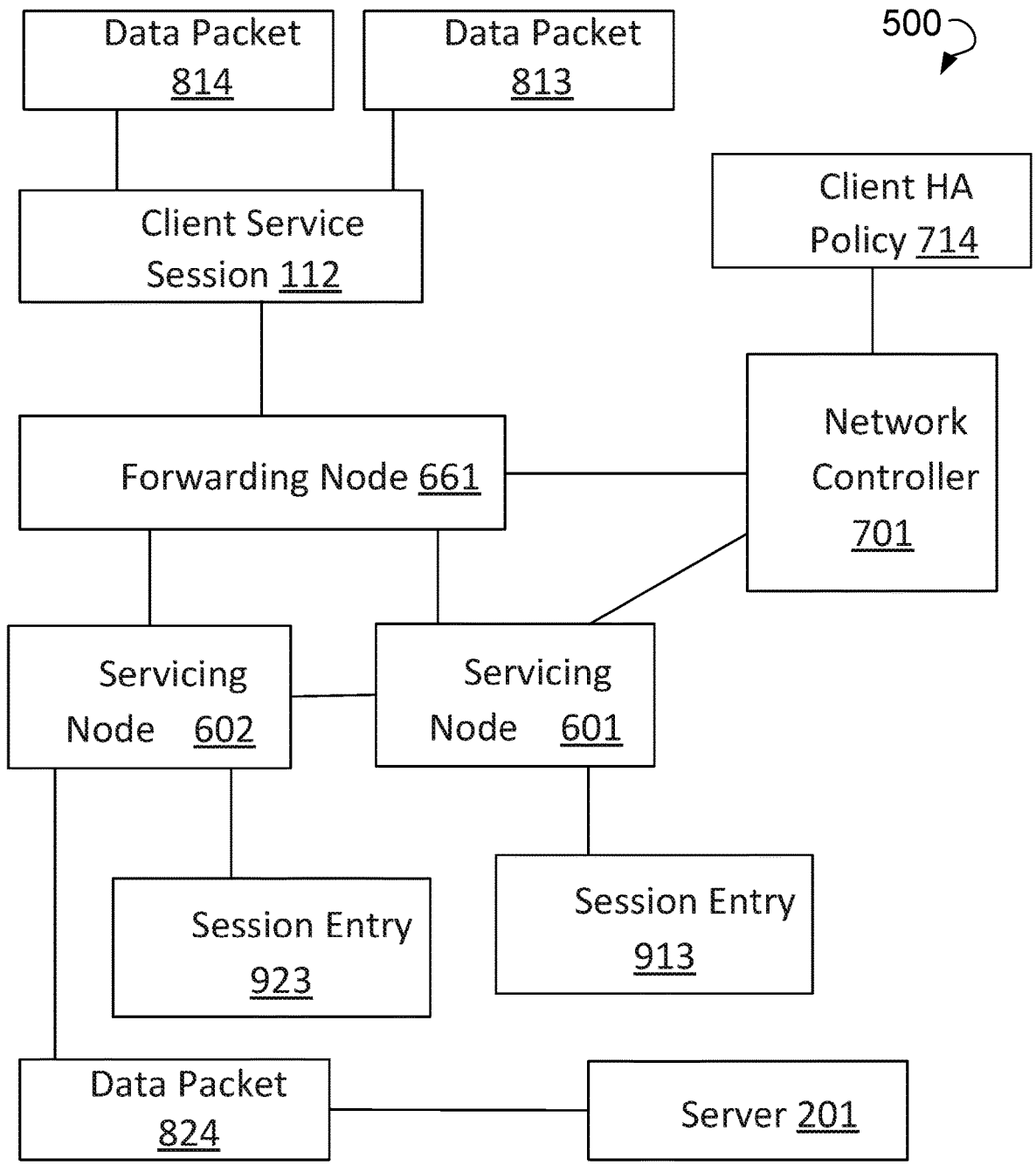
FIG. 5 is a block diagram showing applying high availability to a client service session.

FIG. 5 is a block diagram 500 illustrating providing high availability to a client service session 112, according to an example embodiment. In one embodiment, servicing node 601 receives from network controller 701 a client HA policy 714 which indicates that servicing node 602 is to act as a standby servicing node for servicing node 601. In one embodiment, servicing node 601 creates session entry 913 based on a data packet 813 of client service session 112. Servicing node 601 sends information of session entry 913 to servicing node 602. Servicing node 602 creates session entry 923 according to session entry 913 information. In one embodiment, servicing node 601 updates session entry 913 after processing data packet 813. Servicing node 601 sends updated session entry 913 to servicing node 602, and servicing node 602 updates session entry 923 according to the received session entry 913 update information.

In one embodiment, servicing node 601 becomes unavailable. Servicing node 601 may be unavailable due to failure, maintenance shutdown, or disconnection from forwarding node 661. Servicing node 602 takes over the processing of client service session 112. In one embodiment, forwarding node 661 recognizes unavailability of servicing node 601 and forwards a received data packet 814 of client service session 112 to servicing node 602. In one embodiment, network controller 701 informs forwarding node 661 of the unavailability of servicing node 601, or that forwarding of client service session 112 to servicing node 602 is necessary. In one embodiment, servicing node 602 informs forwarding node 661 to send client 101 the data packets of service session 112 to servicing node 602. In one embodiment, servicing node 601 informs forwarding node 661 that it is becoming unavailable. In one embodiment, forwarding node 661 monitors availability of servicing node 601 and detects servicing node 601 becoming unavailable.

In one embodiment, servicing node 602 receives data packet 814, matches and retrieves session entry 923, processes data packet 814, creates a new data packet 824 based on data packet 814 and session entry 923, and sends data packet 824 to server 201. In one embodiment, the processing of servicing node 602 applicable to data packet 814 is similar to what servicing node 601 would apply to data packet 814 if servicing node 601 was available.

Figure 6:
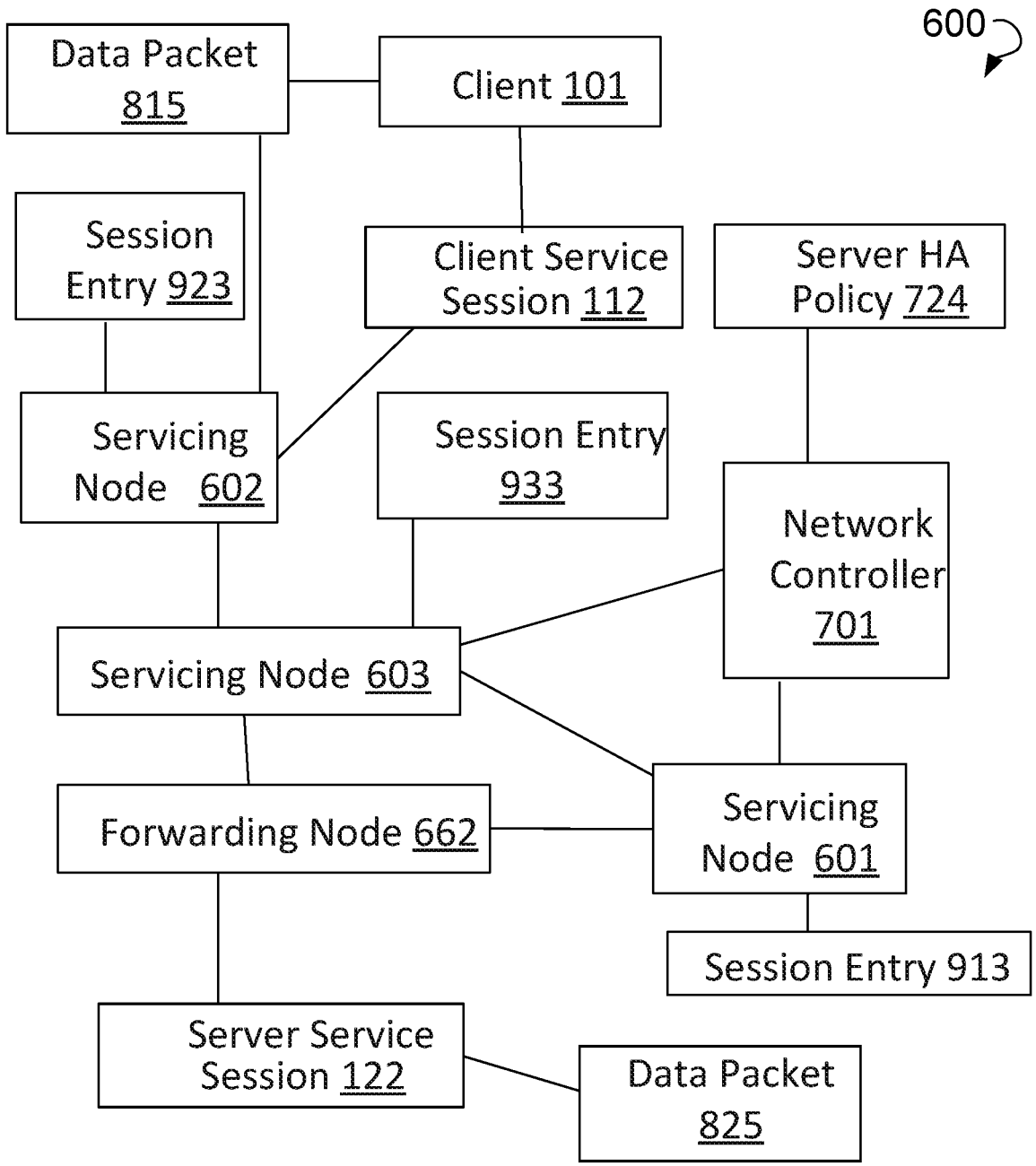
FIG. 6 is a block diagram showing applying high availability to a server service session.

FIG. 6 is a block diagram 600 illustrating an exemplary embodiment of high availability processing for a server service session. In one embodiment, network controller 701 includes server HA policy 724, which includes servicing node 601 acting as an active servicing node for the policy and servicing node 603 acting as a standby servicing node. In one embodiment, server HA policy 724 includes a classification, which may be a NAT IP address or a server IP address.

In one embodiment, servicing node 601 receives from network controller 701 server HA policy 724. Servicing node 601 matches the server HA policy 724 classification against session entry 913 and determines that session entry 913 matches either the NAT IP address or the server IP address of classification of server HA policy 724. In one embodiment, servicing node 601 sends information of session entry 913 to servicing node 603. Servicing node 603 creates session entry 933 based on session entry 913. In one embodiment, servicing node 601 further sends an indication of servicing node 602 associated to session entry 913 to servicing node 603. Servicing node 603 associates session entry 933 with servicing node 602. In one embodiment, session entry 913 includes an indication to servicing node 602, and servicing node 603 associates session entry 933 with servicing node 602. In one embodiment, session entry 933 includes a NAT address or server address of session entry 913 as illustrated in FIG. 3.

In one embodiment, servicing node 603 receives server HA policy 724, either from network controller 701 or from servicing node 601. Servicing node 603 creates session entry 933 and stores the classification of server HA policy 724 in session entry 933. In one embodiment, server HA policy 724 includes an indication to servicing node 602. Service node 603 associates session entry 933 with servicing node 602.

In one embodiment, servicing node 601 becomes unavailable. Forwarding node 662 forwards a subsequent data packet 825 of server service session 122 to servicing node 603. In one embodiment, forwarding node 662 determines servicing node 601 is unavailable and changes a forwarding decision to forward data packets of server service session 122 to servicing node 603. In one embodiment, forwarding node 662 is informed, for example, by servicing node 603 or by network controller 701, to change the forwarding decision. In one embodiment, forwarding node 662 is informed by servicing node 601 to change the forwarding decision.

In one embodiment, servicing node 603 receives data packet 825 of server service session 122. Servicing node 603 extracts one or more network addresses of data packet 825 and matches the extracted network addresses against session entry 933. In one embodiment, servicing node 603 matches the destination network address of data packet 825 against the NAT IP address of session entry 933. In one embodiment, servicing node 603 matches the source network address of data packet 825 against the server address of session entry 933. In one embodiment, servicing node 603 determines there is a match between session entry 933 and data packet 825, and servicing node 603 selects session entry 933 to forward data packet 825 to servicing node 602. In one embodiment, servicing node 603 forwards data packet 825 using forwarding node 662, an IP tunnel between servicing node 603 and servicing node 602, a communication session, a circuit, or a direct link between servicing node 603 and servicing node 602.

In one embodiment, servicing node 602 acts as a standing servicing node to client service session 112 for servicing node 601 as illustrated in FIG. 5. In one embodiment, servicing node 602 stores in session entry 923 all necessary information from session entry 913 to process data packet 825 as if data packet 825 is processed by servicing node 601 using session entry 913. Servicing node 602 generates data packet 815 using session entry 923 as if servicing node 601 would generate data packet 815 using session entry 913. Servicing node 602 sends generated data packet 815 to client 101.

In one embodiment, servicing node 601 serves two or more client service sessions corresponding to two or more server service sessions. Servicing node 601 may use a same NAT IP address for the server service sessions.

In one embodiment, servicing node 601 has two or more standby servicing nodes corresponding to the two or more client service sessions. In one embodiment, servicing node 601 has a same standby servicing node for the corresponding two or more server service sessions. When servicing node 601 becomes unavailable, the same standby servicing node forwards data packets of the two or more server service sessions to the corresponding two or more standby servicing nodes, which in turn process received data packets according to the corresponding two or more client service sessions.

In one embodiment, servicing node 601 has a same standby servicing node for the two or more client service sessions but two or more standby servicing nodes corresponding to the two or more server service sessions. When servicing node 601 becomes unavailable, the two or more standby servicing nodes forward data packets for the corresponding two or more server service sessions to the same standby servicing node for corresponding two or more client service sessions. The same standby servicing node processes the received data packets according to the corresponding two or more client service sessions.

In one embodiment, servicing node 601 becomes available after being unavailable, and standby servicing node 602 for client service session 112 sends session entry 923 updates or information to servicing node 601 such that servicing node 601 updates its corresponding session entry 913. Forwarding node 661 subsequently forwards data packets of client service session 112 to servicing node 601. Servicing node 601 processes these data packets according to the updated session entry 913. In one embodiment, forwarding node 662 subsequently forwards data packets of server service session 122 to servicing node 601. Servicing node 601 processes the data packets of server service session 122 according to the updated session entry 913. In one embodiment, servicing node 603 removes session entry 933 after servicing node 601 becomes available again.

Referencing now to FIG. 7, steps of a method 700 for processing a data packet associated with a service session are shown, according to an example embodiment. In some embodiments the steps may be combined, performed in parallel, or performed in a different order. The method 700 may also include additional or fewer steps than those illustrated. The steps of the method 700 can be executed by components of a data network shown in FIG. 1-6.

The method 700 can commence with receiving, by a forwarding node, the data packet directed to a first servicing node at operation 702. At operation 704, the forwarding node can determine that the first servicing node is unavailable. In an example embodiment, the determining can be based on a notification from a network controller. The notification can be associated with the unavailability of the first servicing node.

Based on the determining, the forwarding node can select a second servicing node from a plurality of servicing nodes at operation 706. The selecting can be based on a HA policy. In an example embodiment, the HA policy can include one or more of a client HA policy and a server HA policy. In a further example embodiment, the forwarding node can optionally receive an availability indication from the second servicing node. Upon selection of the second servicing node, the data packet can be sent to the second servicing node at operation 708.

In an example embodiment, the method 700 may further comprise receiving the data packet by the second servicing node. Upon receiving the data packet, the second servicing node can determine that the data packet includes a service request. Responsive to the determination, the second servicing node can select a server operable to serve the service session. In an example embodiment, the server can be selected based on a service policy. The service policy may comprise a criterion for selecting the server based, for example, on service address, an address of a client service where the packets of the service session are sent from, and so forth.

Upon selection of the server, the second servicing node can send the data packet to the server. The server can be associated with a server network address. In an example embodiment, sending of the data packet to the server includes sending the data packet to a third servicing node. The third servicing node can be associated with the server.

In a further example embodiment, the second servicing node can create a session entry. The session entry can be associated with the service session. The service session can include a client service session. Upon creation of the service session, the second servicing node can associate the session entry with a NAT address. Based on the NAT address, the second servicing node can establish a further service session. The further service session can include a server service session.

In a further example embodiment, the second servicing node can extract at least one of a client network address and a service address from the data packet. The second servicing node can store the extracted client network address and the service address in the session entry.

In an example embodiment, the method 700 further comprises receiving, by the second servicing node, the data packet from the server. The second servicing node can process the data packet. Thus, a processed data packet can be obtained. The second servicing node can retrieve the client network address from the session entry and send the processed data packet to the client device. The client device can be associated with the client network address.

In a further example embodiment, the first servicing node can receive the HA policy. The HA policy can include an indication to the second servicing node. Based on the received HA policy, the first servicing node can update a session entry. Therefore, an updated session entry can be obtained. The first servicing node can send the updated session entry to the second servicing node.

Figure 8:
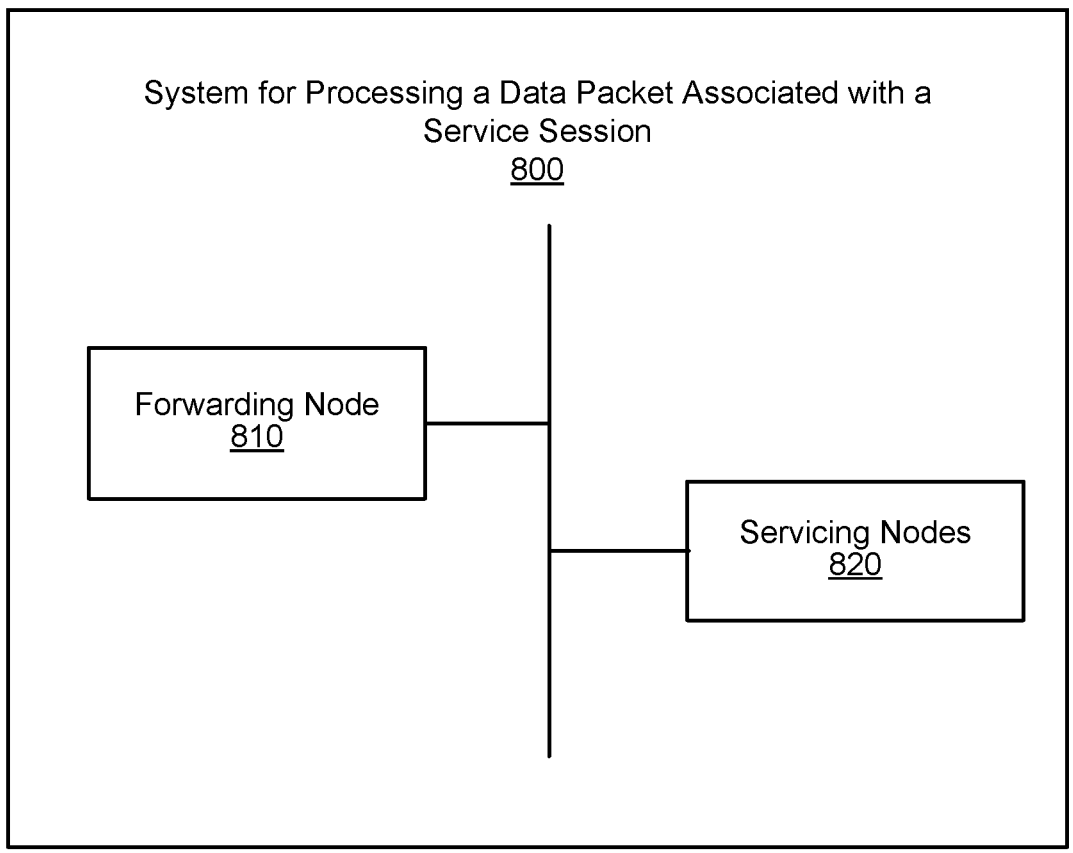
FIG. 8 is block diagram of a system for processing a data packet associated with a service session.

FIG. 8 is a block diagram representing components of a system for processing a data packet associated with a service session, in accordance with certain embodiments. The system 800 can comprise a forwarding node 810 and a plurality of servicing nodes 820. The forwarding node 810 can be operable to receive the data packet directed to a first servicing node. The forwarding node 810 can be further operable to determine that the first servicing node is unavailable. Based on the determining, the forwarding node 810 can be operable to select a second servicing node from a plurality of servicing nodes. The selecting can be based on a HA policy. In an example embodiment, the HA policy includes one or more of a client HA policy and a server HA policy. The forwarding node 810 can be further operable to send the data packet to the second servicing node. In a further example embodiment, the forwarding node 810 can be operable to receive an availability indication from the second servicing node.

The plurality of servicing nodes 820 can include the first servicing node and the second servicing node. In an example embodiment, the second servicing node can be operable to receive the data and determine that the data packet includes a service request. Based on the determining, the second servicing node can be operable to select a server operable to serve the service session. The server can be selected by the second servicing node based on a service policy. The second servicing node can be further operable to send the data packet to the server. The server can be associated with a server network address. In an example embodiment, sending the data packet to the server includes sending the data packet to a third servicing node. The third servicing node can be associated with the server.

In a further example embodiment, the second servicing node can be operable to create a session entry. The session entry can be associated with the service session. The service session can include a client service session. The second servicing node can be operable to associate the session entry with a NAT address. Based on the NAT address, the second servicing node can be operable to establish a further service session. The further service session can include a server service session.

In a further example embodiment, the second servicing node can be operable to extract at least one of a client network address and a service address from the data packet. The second servicing node can store the client network address and the service address in the session entry.

In a further example embodiment, the second servicing node can be operable to receive the data packet from the server. The second servicing node can process the data packet to obtain a processed data packet. The second servicing node can be further operable to retrieve the client network address from the session entry. The second servicing node can send the processed data packet to the client device. The client device can be associated with the client network address.

In a further example embodiment, the first servicing node can be operable to receive the HA policy. The HA policy can include an indication to the second servicing node. The first servicing node can be operable to update a session entry to obtain the updated session entry. Furthermore, the first servicing node can be operable to send the updated session entry to the second servicing node.

Figure 9:
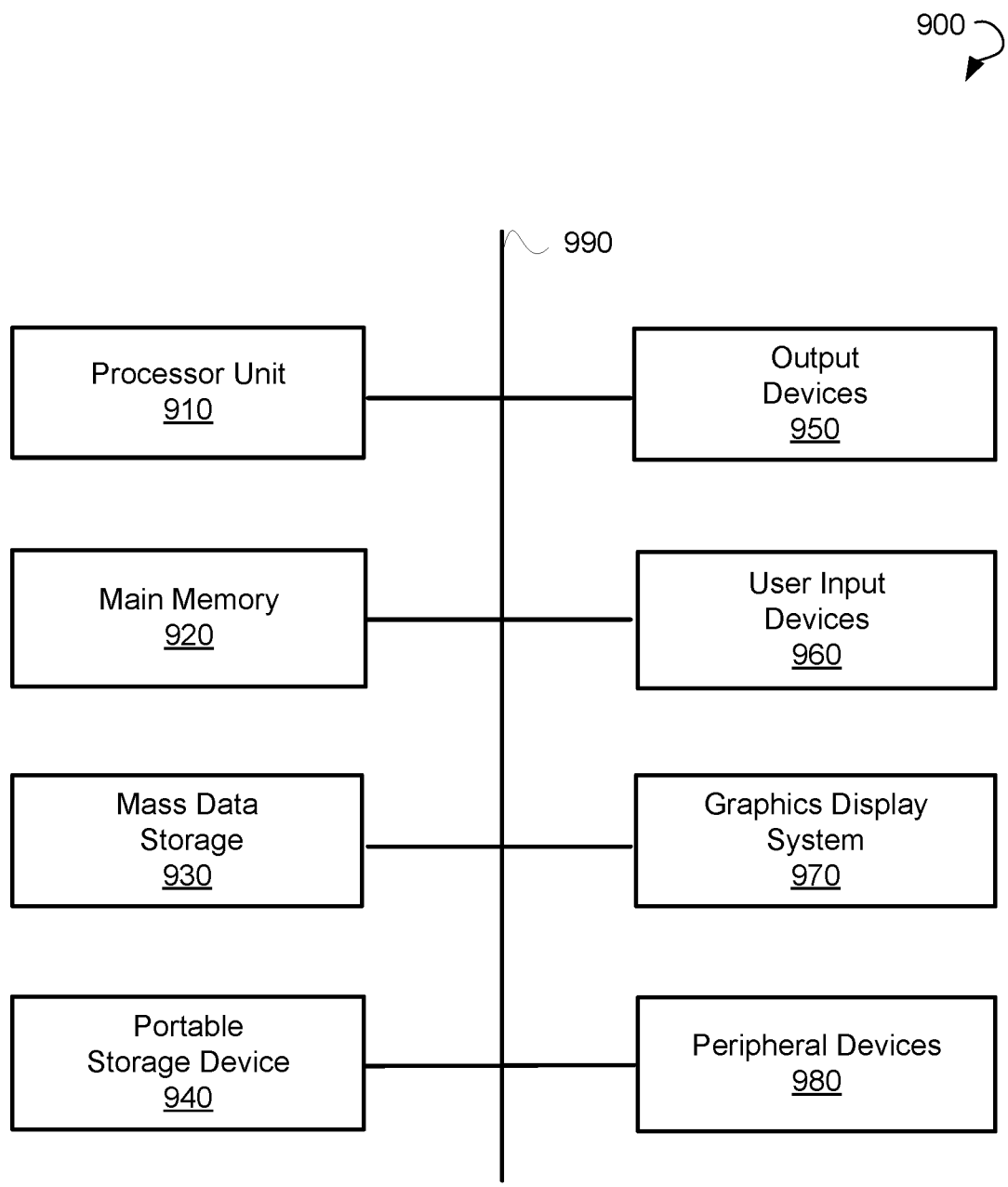
FIG. 9 shows a diagrammatic representation of a computing device for a machine, within which a set of instructions for causing the machine to perform any one or more of the methodologies discussed herein can be executed.

FIG. 9 illustrates an example computer system 900 that may be used to implement embodiments of the present disclosure. The system 900 of FIG. 9 can be implemented in the contexts of the likes of computing systems, networks, servers, or combinations thereof. The computing system 900 of FIG. 9 includes one or more processor units 910 and main memory 920. Main memory 920 stores, in part, instructions and data for execution by processor 910. Main memory 920 stores the executable code when in operation. The computer system 900 of FIG. 9 further includes a mass data storage 930, portable storage device 940, output devices 950, user input devices 960, a graphics display system 970, and peripheral devices 980. The methods may be implemented in software that is cloud-based.

The components shown in FIG. 9 are depicted as being connected via a single bus 990. The components may be connected through one or more data transport means. Processor unit 910 and main memory 920 are connected via a local microprocessor bus, and the mass data storage 930, peripheral device(s) 980, portable storage device 940, and graphics display system 970 are connected via one or more I/O buses.

Mass data storage 930, which can be implemented with a magnetic disk drive, solid state drive, or an optical disk drive, is a non-volatile storage device for storing data and instructions for use by processor unit 910. Mass data storage 930 stores the system software for implementing embodiments of the present disclosure for purposes of loading that software into main memory 920.

Portable storage device 940 operates in conjunction with a portable non-volatile storage medium, such as a floppy disk, CD, DVD, or Universal Serial Bus (USB) storage device, to input and output data and code to and from the computer system 900 of FIG. 9. The system software for implementing embodiments of the present disclosure is stored on such a portable medium and input to the computer system 900 via the portable storage device 940.

User input devices 960 provide a portion of a user interface. User input devices 960 include one or more microphones; an alphanumeric keypad, such as a keyboard, for inputting alphanumeric and other information; or a pointing device, such as a mouse, a trackball, stylus, or cursor direction keys. User input devices 960 can also include a touchscreen. Additionally, the computer system 900 as shown in FIG. 9 includes output devices 950. Suitable output devices include speakers, printers, network interfaces, and monitors.

Graphics display system 970 includes a liquid crystal display (LCD) or other suitable display device. Graphics display system 970 receives textual and graphical information and processes the information for output to the display device.

Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 of FIG. 9 can be a PC, hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, BLU-RAY DISC (BD), any other optical storage medium, RAM, Programmable Read-Only Memory (PROM), Erasable Programmable Read-Only Memory (EPROM), Electronically Erasable Programmable Read Only Memory (EEPROM), flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Figure 10:
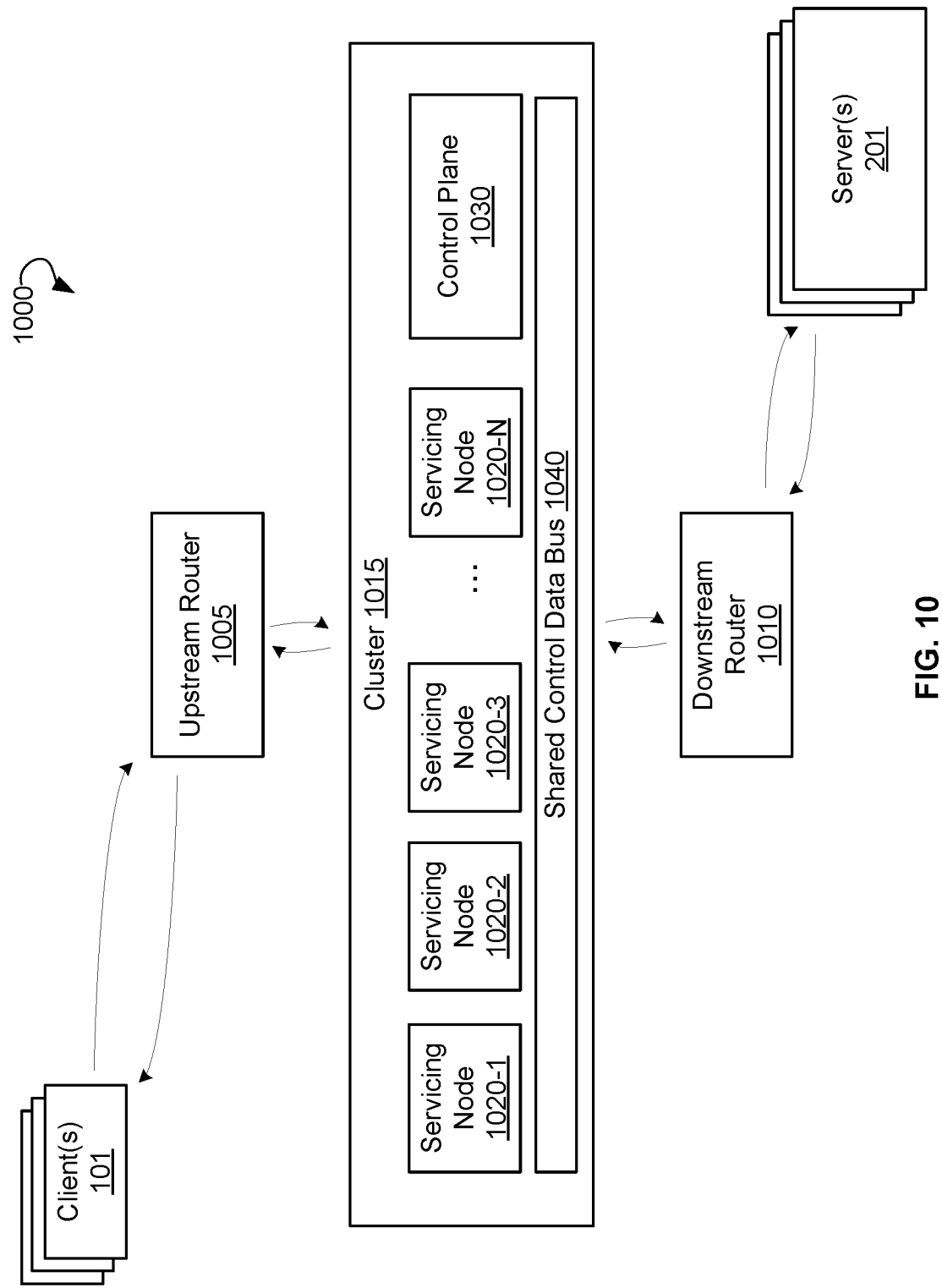
FIG. 10 is a block diagram showing an example system, wherein a method for eliminating data traffic redirection in scalable cluster can be implemented.

FIG. 10 is a block diagram showing an example system 1000, wherein a method for eliminating data traffic redirection in a scalable cluster can be implemented. The system 1000 may include one or more clients 101, an upstream router 1005, a downstream router 1010, a scalable cluster 1015, and one or more servers 201. The scalable cluster 1015 may include servicing node 1020-$i$ ($i$=1, ..., N). The scalable cluster 1015 may further include a shared control data bus 1040. The servicing nodes 1020-$i$ ($i$=1, ..., N) can be configured to exchange data via the shared control data bus 1040. The system 1000 may further include a control plane 1030. The control plane can be implemented as module running on a separate node in the scalable cluster 1015. The servicing node 1020-$i$ ($i$=1, ..., N) may include components similar to components of the network node 610 described in FIG. 2. The control plane 1030, downstream router 1005, upstream server 1010, and servicing node 1020-$i$ ($i$=1, ..., N) can be commutatively connected via a data network.

The upstream router 1005 can be configured to receive, from the client 101, a data packet associated with a service session. The upstream router 1005 may be configured to direct the data packet to one of the servicing nodes 1020-$i$ ($i$=1, ..., N) for further processing. If the data packet belongs to a new service session, the upstream router 1005 may select one of the servicing nodes 1020-$i$ ($i$=1, ..., N) from the cluster 1015 and assign the selected servicing node to the new service session. The selection of the servicing node can be based on equal-cost multi-path routing (ECMP) hashing. Upon receiving the data packet from a new service session, the selected servicing node may generate or receive a session context associated with a new service session. The selected servicing node can be further configured to store the session context required for processing data packets of the new service session. The upstream router 1005 can be further configured to send further packets associated with the new service session to the selected servicing node. For example, the upstream router 1005 may map an IP address of the client 101 and IP address of the selected servicing node.

There is a probability that a data packet can be sent to a servicing node that is not responsible for processing that data packet. In this case, the traffic must be redirected to the correct node. FIG. 11A is block diagram showing processing of a data packet by a servicing node 1020-1. Upon receiving the data packet, the servicing node 1020-1 may determine, based on an IP address indicated in the data packet, that the data packet is directed to a servicing node 1020-2. The servicing node 1020-1 may redirect the data packet to the servicing node 1020-2 for further processing.

To eliminate further redirection, the servicing nodes 1020-$i$ ($i$=1, ..., N) can be configured to advertise to the upstream router 1005 the correct path to the servicing node that processes the data packets for the client 101 with a particular NAT IP. The amount of redirection might therefore significantly increase during transient stages of the cluster 1015. The transient stages may be caused by a failover of one or more servicing nodes 1020-$i$ ($i$=1, ..., N) or resizing the cluster 1015 by adding or removing one of the servicing nodes 1020-$i$ ($i$=1, ..., N).

Figure 11B:
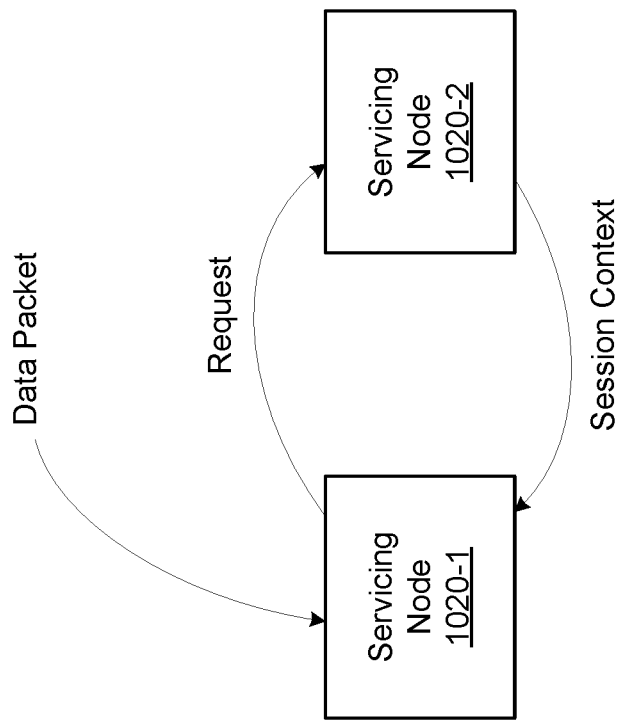
FIG. 11B is a block diagram showing processing of a data packet by a servicing node without redirection of the data packet.
Figure 11A:
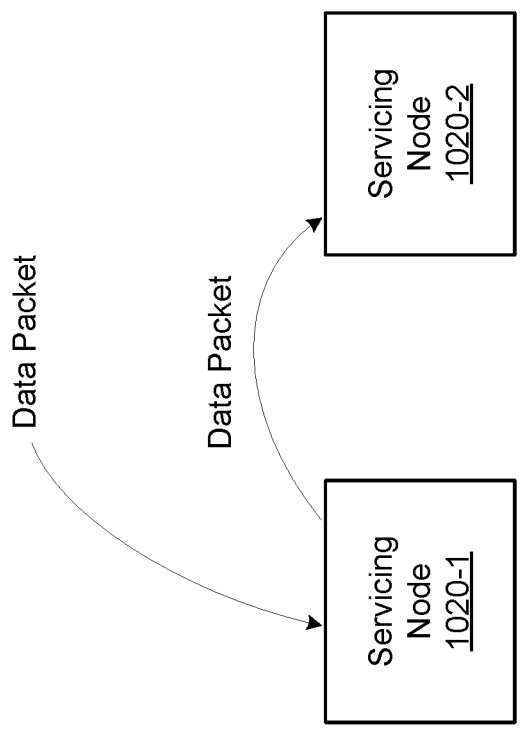
FIG. 11A is a block diagram showing processing of a data packet by servicing nodes with redirection the data packet between the servicing nodes.

FIG. 11B is a block diagram showing process of a data packet by the servicing node 1020-1 without redirection of a data traffic. The servicing node 1020-1 may determine that the data packet is directed to the servicing node 1020-2. Since the data packet is directed to the servicing node 1020-2, the servicing node 1020-2 may keep a session context for the service session to which the data packet belongs. The servicing node 1020-1 can be configured to request a session context associated with the service session from the servicing node 1020-2. After receiving the session context, the servicing node 1020-1 can be further configured to process the data packet based on the session context. Since an amount of control data in a session context is smaller than an amount of data in a data packet, transferring a session context between the servicing nodes may result in spending less computing and network time than for redirection of the data packet between the servicing nodes.

Figure 12:
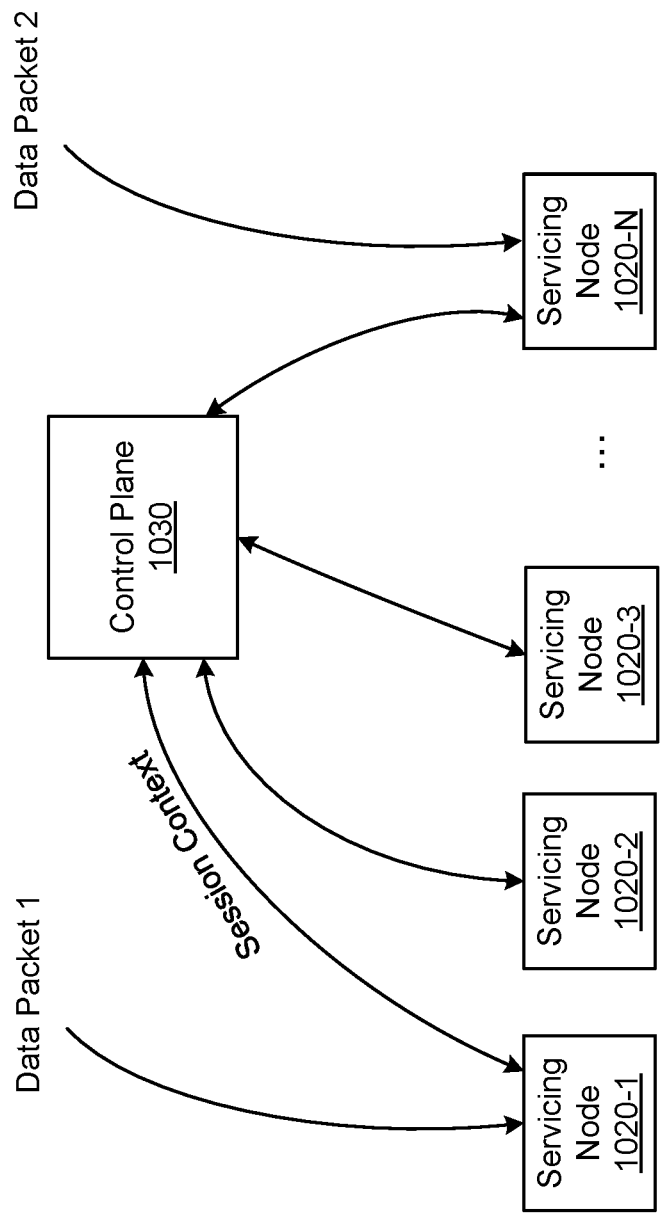
FIG. 12 is a block diagram showing handling of session contexts associated with service sessions.

FIG. 12 is a block diagram showing functionality of the control plane 1030, according to some example embodiments of the present disclosure. The control plane 1030 can be configured to synchronize session contexts of service sessions stored in the servicing nodes 1020-$i$ ($i=1, \ldots, N$). For example, the servicing node 1020-1 may receive a data packet 1 of a service session. The servicing node 1020-1 may receive or generate a session context for the service session. The session context can be further stored in a dedicated memory of the servicing node 1020-1.

In some embodiments, the control plane 1030 may be configured to acquire session contexts stored in servicing nodes 1020-$i$ ($i=1, \ldots, N$) for different service sessions. The control plane 1030 may further synchronize the session contexts between the servicing node 1020-$i$ ($i=1, \ldots, N$), so each of the servicing nodes 1020-$i$ ($i=1, \ldots, N$) may not need to request the session context from other servicing nodes. For example, if the servicing node 1020-N receives a data packet 2 for the service session, the session context of the service session may be already stored in dedicated memory of the servicing node 1020-N. If the session context cannot be found in the dedicated memory of the servicing node 1020-N, the servicing node 1020-N may request the session context from the servicing node to which the data packet 2 is directed (for example, the servicing node 1020-1).

In certain embodiments, to eliminate full duplication of session contexts in servicing nodes 1020-$i$ ($i=1, \ldots, N$), the control plane 1030 can be configured to synchronize only selected session contexts. The session contexts can be selected based on priority of service sessions. For example, the services sessions where data traffic requires a smaller latency may be given a higher priority. Session contexts not selected for synchronization between the servicing nodes can be requested by one servicing node directly from another servicing node as shown in FIG. 11B.

Eliminating redirection of data traffic by transferring session context instead of data packets between the servicing node 1020-$i$ ($i=1, \ldots, N$) may provide the following advantages for performance of scalable cluster 1015.

1) Amount of data transferred between servicing nodes can be reduced, which results in fewer computing and network resources required to be spent on the data transferring.

2) Synchronization of session context containing control data can be required per service session and not per data packet as in case of the traffic redirection.

3) Interaction of servicing nodes with upstream router or downstream router can be reduced. Since each of the servicing nodes can handle the data packets without redirection, the servicing nodes may not be required to advertise a correct path to the upstream router or the downstream router. The interaction of servicing nodes with the routers may be required during transient stage of the cluster 1015, when one or more servicing nodes are added to or removed from the cluster or there is a failure of one or more servicing nodes. The failover and resizing of the cluster can be carried out internally using cluster resources with minimum interaction with external devices, such as routers and client devices.

4) The servicing node may not require information on how external devices externally distribute the data traffic.

Figure 13:
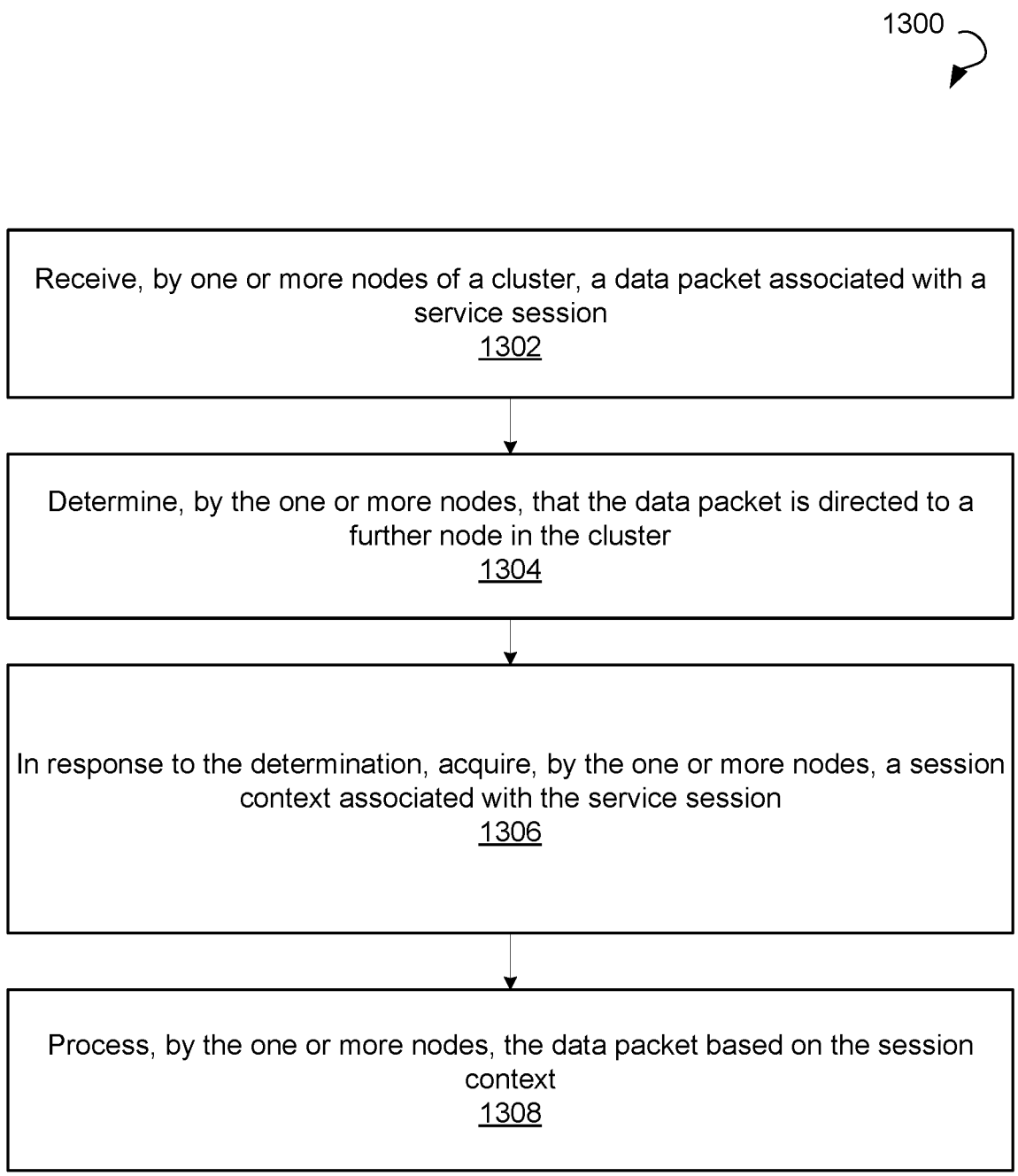
FIG. 13 is flow chart showing a method for eliminating data traffic redirection in a scalable cluster, according to an example embodiment.

FIG. 13 is a flow chart showing a method 1300 for eliminating redirection of a data traffic in clusters, according to some example embodiments of the present disclosure. The method can be implemented in system 1000 shown in FIG. 10.

The method 1300 may commence, in block 1302, with receiving, by one or more nodes of the cluster, a data packet associated with a service session.

In block 1304, the method 1300 may include determining, by the one or more nodes, that the data packet is directed to a further node in the cluster.

In block 1306, the method 1300 may include, in response to the determination, acquiring, by the one or more nodes, a session context associated with the service session. To acquire the session context, the node may extract an IP address of the further node and a session identifier from the data packet. The node can further send a request for the session context to the further node. The request may include a session identifier. The node can receive the session context from a control plane. The control plane can be configured to synchronize session contexts stored on different nodes of the cluster.

In block 1308, the method 1300 may include processing, by the one or more nodes, the data packet based on the session context.

Thus, methods and systems for eliminating data traffic redirection in a scalable cluster are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A system for eliminating a redirection of data traffic, the system comprising:
   a cluster comprising one or more nodes, the one or more nodes being configured to:
      receive, from a forwarding node, a data packet associated with a service session;
      determine that the one or more nodes is not assigned to process the service session, the service session including an existing service session processed by a further node in the cluster; and
   in response to the determination:
      acquire a session context associated with the service session from a separate node acting as a control plane, wherein a first time spent by the one or more nodes for the acquiring the session context from the control plane is less than a second time needed by the one or more nodes to redirect the data packet to the further node; and process the data packet based on the session context without forwarding the data packet to the further node; and wherein the control plane:
   obtains a plurality of session contexts of service sessions;
   selects one or more session contexts from the plurality of session contexts based on priorities of the service sessions, wherein the priorities of the service sessions are based on latency requirements for the service sessions; and
   after the selecting the one or more session contexts, synchronizes the one or more session contexts from the plurality of session contexts with the session context.

2. The system of claim 1, wherein the one or more nodes are further configured to store the session context in a dedicated memory.

3. The system of claim 2, wherein the obtaining the plurality of session contexts is performed by acquiring the session context from the one or more nodes.

4. The system of claim 3, wherein the one or more nodes are configured to acquire a further session context by sending a request for the further session context to the control plane.

5. The system of claim 3, wherein the session context is stored in the one or more nodes in the cluster.

6. The system of claim 1, wherein the one or more nodes are further configured to:
   receive a further packet of a further service session;
   generate a further session context associated with the further service session; and
   send the further session context to one or more further nodes of the cluster.

7. The system of claim 1, wherein the one or more nodes are configured to:
   send a request for the session context to the further node; and
   receive the session context from the further node.

8. A method for eliminating a redirection of data traffic in a cluster, the method comprising:
   receiving, by one or more nodes of the cluster, from a forwarding node, a data packet associated with a service session;
   determining, by the one or more nodes, that the one or more nodes is not assigned to process the service session, the service session including an existing service session processed by a further node in the cluster;
   in response to the determination:
      acquiring, by the one or more nodes, a session context associated with the service session from a separate node acting as a control plane, wherein a first time spent by the one or more nodes for the acquiring the session context from the control plane is less than a second time needed by the one or more nodes to redirect the data packet to the further node; and
      processing, by the one or more nodes, the data packet based on the session context without forwarding the data packet to the further node;
   obtaining, by the control plane, a plurality of session contexts of service sessions;
   selecting, by the control plane, one or more session contexts from the plurality of session contexts based on priorities of the service sessions, wherein the priorities of the service sessions are based on latency requirements for the service sessions; and
   after the selecting the one or more session contexts, synchronizing, by the control plane, the one or more session contexts from the plurality of session contexts with the session context.

9. The method of claim 8, further comprising storing, by the one or more nodes, the session context in a dedicated memory.

10. The method of claim 9, wherein the obtaining, by the control plane, the plurality of session contexts is performed by acquiring the session context from the one or more nodes.

11. The method of claim 10, further comprising acquiring, by the one or more nodes, a further session context by sending a request for the further session context to the control plane.

12. The method of claim 10,
   wherein the session context is stored in the one or more nodes of the cluster.

13. The method of claim 8, wherein the acquiring the session context includes:
   sending, by the one or more nodes, a request for the session context to the further node; and
   receiving, by the one or more nodes, the session context from the further node.

14. The method of claim 8, further comprising:
   receiving, by the one or more nodes, a further packet of a further service session;
   generating, by the one or more nodes, a further session context associated with the further service session; and
   sending, by the one or more nodes, the further session context to one or more further nodes of the cluster.

15. A non-transitory computer-readable medium having embodied thereon a program, the program providing instructions for a method for eliminating a redirection of data traffic in a cluster, the method comprising:
   receiving, by one or more nodes of the cluster, from a forwarding node, a data packet associated with a service session;
   determining, by the one or more nodes, that the one or more nodes is not assigned to process the service session, the service session including an existing service session processed by a further node in the cluster;
   in response to the determination:
      acquiring, by the one or more nodes, a session context associated with the service session from a separate node acting as a control plane, wherein a first time spent by the one or more nodes for the acquiring the session context from the control plane is less than a second time needed by the one or more nodes to redirect the data packet to the further node; and
      processing, by the one or more nodes, the data packet based on the session context without forwarding the data packet to the further node;
   obtaining, by the control plane, a plurality of session contexts of service sessions;
   selecting, by the control plane, one or more session contexts from the plurality of session contexts based on priorities of the service sessions, wherein the priorities of the service sessions are based on latency requirements for the service sessions; and
   after the selecting the one or more session contexts, synchronizing, by the control plane, the one or more session contexts from the plurality of session contexts with the session context.

* * * * *